United States Patent
Ono et al.

(10) Patent No.: US 7,503,232 B2
(45) Date of Patent: Mar. 17, 2009

(54) WORKING VEHICLE

(75) Inventors: Kouki Ono, Ehime (JP); Mitsuhiko Ikeda, Ehime (JP)

(73) Assignee: Iseki & Co., Ltd., Ehime (JP)

( * ) Notice: Subject to any disclaimer, the term of this patent is extended or adjusted under 35 U.S.C. 154(b) by 390 days.

(21) Appl. No.: 10/578,472

(22) PCT Filed: Oct. 28, 2004

(86) PCT No.: PCT/JP2004/016016

§ 371 (c)(1),
(2), (4) Date: May 5, 2006

(87) PCT Pub. No.: WO2005/045285

PCT Pub. Date: May 19, 2005

(65) Prior Publication Data

US 2007/0044582 A1   Mar. 1, 2007

(30) Foreign Application Priority Data

Nov. 6, 2003   (JP) .............................. 2003-377409

(51) Int. Cl.
*F16H 59/00* (2006.01)
(52) U.S. Cl. ...................................................... 74/335
(58) Field of Classification Search .................. 74/335, 74/473.3; 200/61.91
See application file for complete search history.

(56) References Cited

U.S. PATENT DOCUMENTS 4,126,055 A * 11/1978 Forsyth .................... 74/473.22
5,880,422 A * 3/1999 Sato et al. ................. 200/61.88
6,564,661 B2 * 5/2003 DeJonge ....................... 74/335
6,796,202 B2 * 9/2004 Takai et al. ............... 74/473.12
7,014,592 B2 * 3/2006 Wiethe et al. ............... 477/120

FOREIGN PATENT DOCUMENTS

JP          60-245858      12/1985
JP          5-052254        3/1993

(Continued)

OTHER PUBLICATIONS

English Language Abstract of JP 2003-301940.
English Language Abstract of JP 2003-278903.
English Language Abstract of JP 2003-042288.

(Continued)

*Primary Examiner*—Ha D. Ho
(74) *Attorney, Agent, or Firm*—Greenblum & Bernstein, P.L.C.

(57) ABSTRACT

A working vehicle is constructed such that rotation power of an engine is transmitted to drive wheels via a main speed-changing device and an auxiliary speed-changing device and that shift positions of the auxiliary speed-changing device are switchable by shift operation of a shift lever. At an operation position for working, shift positions can be switched, by the main speed-changing device and the auxiliary speed-changing device, between numerous positions from a low-speed range to a high-speed range. At an operation position for road traveling, shift positions of the main speed-changing device can be smoothly switched, in conjunction with operation of an accelerator pedal or a throttle lever, only within a high-speed range suitable for road traveling. The shift lever has a switch allowing the main speed-changing device to be shifted one by one to each shift stage in the speed increasing direction or in the speed reducing direction.

6 Claims, 11 Drawing Sheets

FOREIGN PATENT DOCUMENTS

| | | | |
|---|---|---|---|
| JP | 05052254 A | * | 3/1993 |
| JP | 2003-042288 | | 2/2003 |
| JP | 2003-278903 | | 10/2003 |
| JP | 2003-301940 | | 10/2003 |

OTHER PUBLICATIONS

English Language Abstract of JP 60-245858.
English Language Abstract of JP 5-052254.

* cited by examiner

| Shift stage | Main shift monitor display (on road) | Main shift (actuator operation) | | Auxiliary shift (lever shift operation) |
|---|---|---|---|---|
| | | First main shift | Second main shift | |
| 1 | 1 | 1 | L | L |
| 2 | 2 | 2 | L | L |
| 3 | 3 | 3 | L | L |
| 4 | 4 | 4 | L | L |
| 5 | 5 | 1 | H | L |
| 6 | 6 | 2 | H | L |
| 7 | 7 | 3 | H | L |
| 8 | 8 | 4 | H | L |
| 9 | 1 | 1 | L | M |
| 10 | 2 | 2 | L | M |
| 11 | 3 | 3 | L | M |
| 12 | 4 | 4 | L | M |
| 13 | 5 | 1 | H | M |
| 14 | 6 | 2 | H | M |
| 15 | 7 | 3 | H | M |
| 16 | 8 | 4 | H | M |
| 17 | 1 | 1 | L | H |
| 18 | 2 | 2 | L | H |
| 19 | 3 | 3 | L | H |
| 20 | 4 | 4 | L | H |
| 21 | 5(1) | 1 | H | H |
| 22 | 6(2) | 2 | H | H |
| 23 | 7(3) | 3 | H | H |
| 24 | 8(4) | 4 | H | H |

| Shift stage | Main shift monitor display (on road) | switching at P1 | switching at P2 | Auxiliary shift position |
|---|---|---|---|---|
| 17 | 1 | ○ | | H |
| 18 | 2 | ○ | | H |
| 19 | 3 | ○ | | H |
| 20 | 4 | ○ | | H |
| 21 | 5(1) | ○ | ○ | H |
| 22 | 6(2) | ○ | ○ | H |
| 23 | 7(3) | ○ | ○ | H |
| 24 | 8(4) | ○ | ○ | H |

| Shift stage | Main shift monitor display (on road) | switching at P1 | switching at P2 | Auxiliary shift position |
|---|---|---|---|---|
| 17 | 1 | ○ | | |
| 18 | 2 | ○ | | |
| 19 | 3 | ○ | | |
| 20 | 4 | ○ | | H |
| 21 | (1) | | ○ | |
| 22 | (2) | | ○ | |
| 23 | (3) | | ○ | |
| 24 | (4) | | ○ | |

Fig. 13

| Shift stage | Main shift monitor display (on road) | switching at P1 | switching at P2 | Auxiliary shift position |
|---|---|---|---|---|
| 17 | 1 (1) | ◯ | ◯ | H |
| 18 | 2 | ◯ | | |
| 19 | 3 (2) | ◯ | ◯ | |
| 20 | 4 | ◯ | | |
| 21 | 5 (3) | ◯ | ◯ | |
| 22 | 6 | ◯ | | |
| 23 | 7 (4) | ◯ | ◯ | |
| 24 | 8 (5) | ◯ | ◯ | |

US 7,503,232 B2

WORKING VEHICLE

TECHNICAL FIELD

The present invention relates to a working vehicle for agricultural work, construction work, and transportation work, and in particular, to a working vehicle that has a shift control device that reduces speed changing operations and makes traveling of the vehicle smooth according to the status of use and the purpose of use between during traveling for agricultural work, construction work, and transportation work and during traveling on a road involving no work.

BACKGROUND ART

Conventionally, a shift control device in a working vehicle such as a tractor for agricultural work is constructed as disclosed in Japanese Published Unexamined Patent Application No. H05-52254 so that the rotation power of the engine is transmitted to the front and rear wheels through a main speed-changing device and an auxiliary speed-changing device, the main speed-changing device can be automatically or manually switched by driving an actuator, and the auxiliary speed-changing device can be mechanically switched by a shift operation of a shift lever.

DISCLOSURE OF THE INVENTION

The above-described tractor can be changed in speed in a multistage manner by combining a plurality of speed changing devices so as to be adapted to various works. Therefore, the shift positions are so finely set that an unaccustomed operator is required to perform complicated speed changing operations when he/she tries to travel the tractor at a high speed on an ordinary road.

The present invention is proposed in view of the above-described problem, and an object thereof is to provide a working vehicle having a shift control device that reduces speed changing operations or makes traveling of the vehicle smooth according to the state of use and the purpose of use of the vehicle during various agricultural works and during road traveling.

According to the first aspect of the invention, the working vehicle comprising: an engine (E); a main speed-changing device (1) that changes the rotation power of the engine (E) to any of a plurality of shift positions; an auxiliary speed-changing device (2) that further shifts the shift position selected by the main speed-changing device (1) to any of the plurality of shift positions; wheels (3F,3R) that are transmitted the rotation power of the engine (E) through the main and auxiliary speed-changing devices (1,2); a shift lever (5) that switches the shift position of the auxiliary speed-changing device (2) by manual operation; an accelerator pedal (8) and/or a throttle lever (17) for adjusting the rotation speed of the engine (E)by manual operations; shift means (S) that makes the shift lever (5) switchable between an operation position (P1) for working, intended for working other than road traveling, and an operation position (P2) for road traveling, intended for road traveling; and a shift control device (7) that switches the shift position of the main speed-changing device (1) by interlocking with a manual operation on the accelerator pedal (8) and/or the throttle lever (17), disables shifting of the main speed-changing device (1) to the shift range of the low speed side, and enables shifting to the shift range of the high speed side when the shift lever (5) is switched to the operation position (P2) for road traveling.

In the working vehicle according to a first aspect of the invention, when the shift lever (5) is switched to the operation position (P1) for working, a shift stage suitable for working is obtained, and when it is switched to the operation position (P2) for road traveling, the shift position of the main speed-changing device (1) can be shifted by an operation on the accelerator pedal (8) and/or the throttle lever (17). And when the shift lever (5) is switched from the operation position (P1) for working to the operation position (P2) for road traveling, the low-speed range of the main speed-changing device (1) is cut and speed changing to only the high-speed range is enabled.

In the first aspect of the invention, during setting of the shift lever (5) at the operation position (P2) for road traveling, according to an operation on the accelerator pedal (8) and/or the throttle lever (17), the main shift position is also shifted up or down by interlocking with the operation, so that in comparison with the conventional construction that makes the vehicle travel while keeping a constant main shift position, the operability becomes higher, the fuel cost is reduced, and the vehicle can quickly move between agricultural fields or on a road. And by switching the shift lever (5) to the operation position (P2) for road traveling, speed changing to the main shift range of the low speed side becomes impossible, and speed changing is made only in the high-speed range necessary for fast movement, so that in the case of traveling on a road, the time until the speed reaches a target vehicle speed is shortened and the operability is improved.

According to the second aspect of the invention, the working vehicle according to claim 1, wherein shift switches (29u, 29d) that shift up and down the shift position of the main speed-changing device (1) one by one are provided on the shift lever (5), and an operation switch (6) that enables switching of the main speed-changing device (1) by interlocking it with an operation on the accelerator pedal (8) and/or the throttle lever (17) when the shift lever (5) is switched to the operation position (P2) for road traveling are provided on or near the shift lever (5).

In the second aspect of the invention, in addition to the action of the first aspect, during working an appropriate shift stage is selected by operating the shift switches (29u and 29d), and during road traveling, the operation switch (6) is switched to turn the switching operation of the main speed changing on and off according to an operation on the accelerator pedal (8) and/or the throttle lever (17).

In the second aspect of the invention, in addition to the effect of the first aspect of the invention, the shift switches (29u and 29d) that shift up or down the shift position of the main speed-changing device (1) one by one are provided on the shift lever (5), and an operation switch (6) that turns the main shift switching operation on or off by interlocking with an operation on the accelerator pedal (8) and/or the throttle lever (17), are provided on or near the shift lever (5), so that switching between the speed changing operation for working and speed changing operation for road traveling can be easily performed, so that the vehicle operability is remarkably improved. Operations relating to these switchings can be collectively performed on or near the shift lever (5), so that the operability is high.

According to the third aspect of the invention, the working vehicle according to Claim 2, wherein the shift control device (7) comprises: first shift control means constructed so that, when it switches the shift lever (5) to the low speed side while the operation switch (6) is not actuated, the main speed-changing device (1) is responsively switched to the high speed side, and when it switches the shift lever (5) to the high speed side, the main speed-changing device (1) is responsively switched to the low speed side, and second shift control means for switching the main speed-changing device (1) to a main shift position whose past accumulative operating time in the past is longest when the shift lever (5) at the operation position (P1) for working is operated during actuation of the operation switch (6).

In the third aspect of the invention, by an operation on the switch (6) provided on or near the operation lever (5), switching is easily performed between the first shift control for traveling while restraining fluctuations of the vehicle speed and the second shift control for switching to a main shift position that has been used for the longest time during working according to the working purpose and status.

In the third aspect of the invention, in addition to the effect of the first and second aspects of the invention, switching between the first shift control means and the second shift control means can be easily performed near the operator's hand, so that switching can be easily performed according to the purpose of working. Namely, for example, when selecting an appropriate working speed by switching the auxiliary speed-changing device (2) for working in, for example, one agricultural field, selection between prioritizing of an original working speed and speed changing while restraining vehicle speed fluctuations, can be easily performed by turning the operation switch (6) on and off.

According to the fourth aspect of the invention, the working vehicle according to any of claims 1 through 3, wherein a reverse switch (38) that enables the working vehicle to travel in reverse is provided, and the shift control device (7) restrains speed control of the accelerator pedal (8) and/or the throttle lever (17) during actuation of the reverse switch (38).

In the fourth aspect of the invention, during reverse traveling of the vehicle, speedup is restrained even when the accelerator pedal (8) and/or the throttle lever (17) is operated.

In the fourth aspect of the invention, in addition to the effect of any of the first through third aspects of the invention, a speed increase is restrained when the vehicle travels in reverse, whereby safe traveling of the vehicle can be kept.

BEST MODE FOR CARRYING OUT THE INVENTION

Hereinafter, an embodiment of the invention applied to an agricultural tractor as a working vehicle will be explained.

First, the entire construction of the tractor 10 will be explained.

Figure 5:
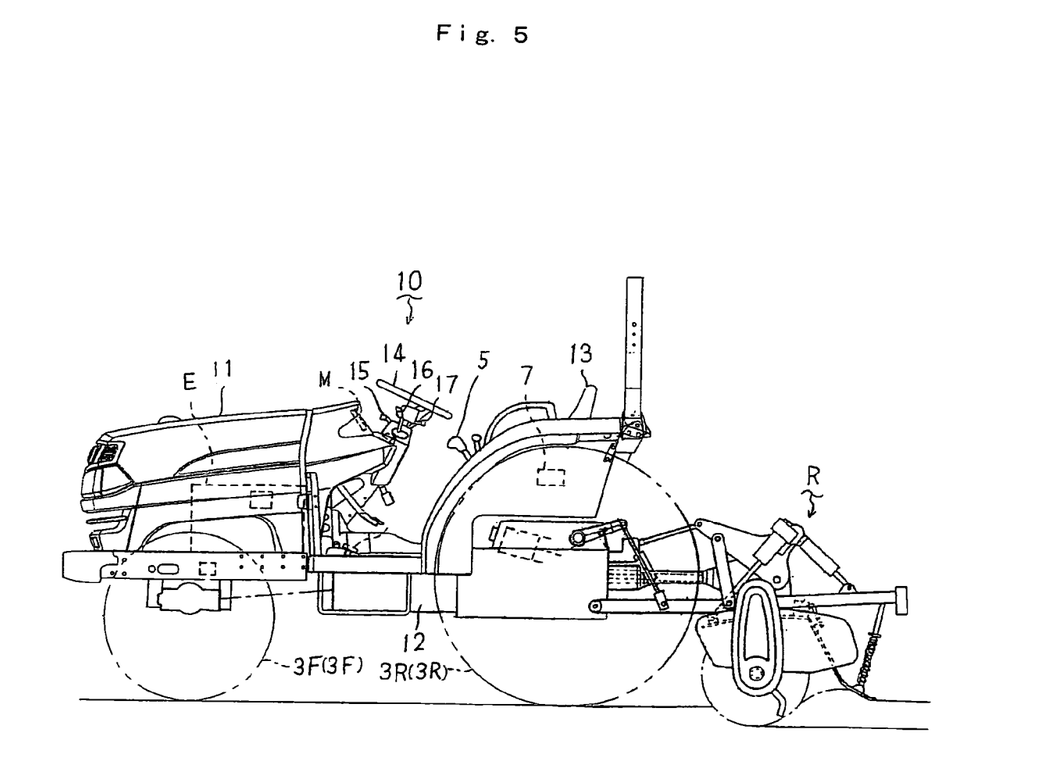
FIG. 5 is an entire side view of the tractor of the embodiment of the invention.
Figure 6:
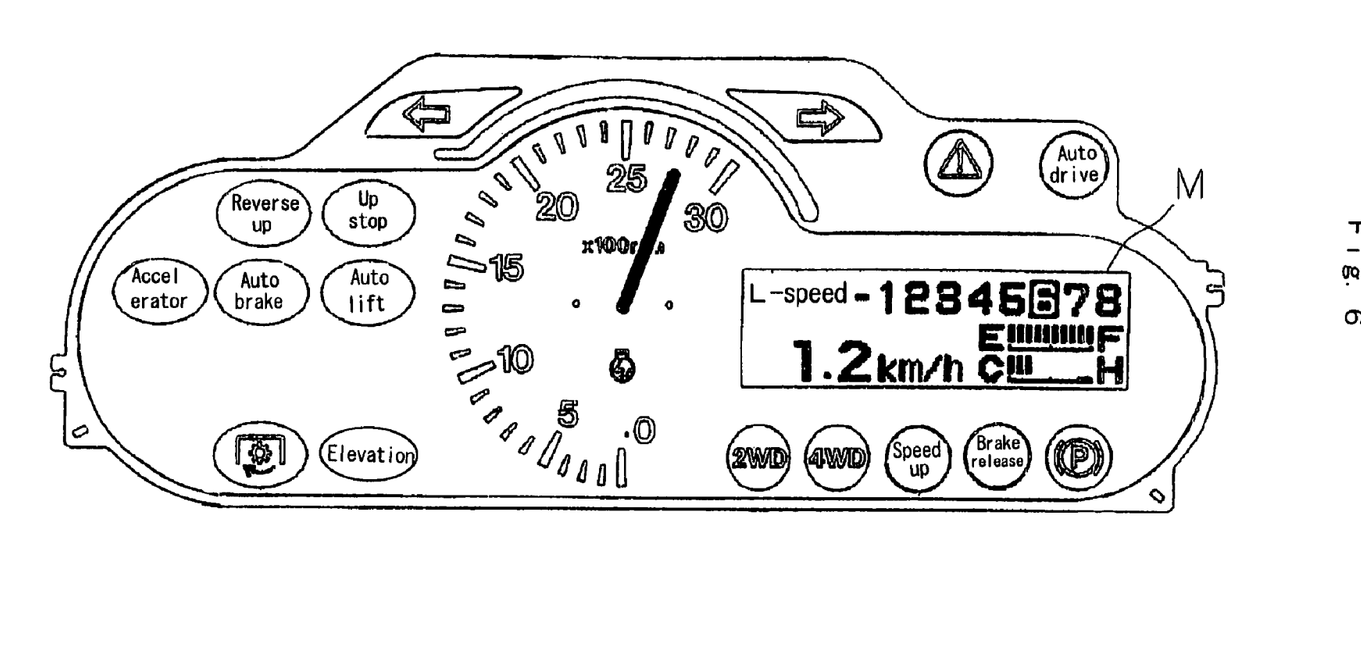
FIG. 6 is a front view of a monitor portion of the tractor of the embodiment of the invention.

The tractor 10 has, as shown in FIG. 5, an engine E installed inside a bonnet 11, and the tractor travels by transmitting the rotation power of the engine E to the respective left and right front wheels 3F and 3F and left and right rear wheels 3R and 3R through the main and auxiliary speed-changing devices inside a transmission case 12. Above the transmission case 12, a driver's seat 13 is provided, and at a position on the front of the driver's seat, a steering handle 14 is provided, and on a handle post below the handle 14, an elevation lever 15 for elevating a working machine R by one-touch operation, a throttle lever 17 for adjusting the number of rotations of the engine E, and a forward and reverse switch lever 16, etc., are supported. At a base portion of the forward and reverse switch lever 16, a forward switch 37 and a reverse switch 38 that detect forward and reverse traveling operations performed by an operator are provided, and in response to detection signals of these switches 37 and 38, an operation for engaging the clutch of the forward and reverse switching device 21 described later is performed. On the front side of the floor face below the handle post, an accelerator pedal 8 is provided, and as conventionally known, when stepping on the accelerator pedal 8 by a stepping operation upon setting a throttle position held by the throttle lever 17 as a lowest position, the fuel injection amount increases and accelerates the tractor, and when releasing the foot from the accelerator pedal 8, the engine rotations become the number set by the throttle lever 17.

Next, the power transmission path of the tractor 10 will be explained in detail based on FIG. 2.

The rotation power from the engine E is transmitted to the forward and reverse switching device 21, the main speed-changing device 1 (first main speed-changing device 1a and second main speed-changing device 1b), and an auxiliary speed-changing device 2 in order, provided inside a transmission case 12 through the main clutch 20. Then, the rotation power reduced by the main speed-changing device 1 and the auxiliary speed-changing device 2 are transmitted to the rear wheels 3R and 3R through the rear wheel differential mechanism 22, and further transmitted to the front wheels 3F and 3F through a front and rear wheel drive switching device 23 and the front wheel differential mechanism 24.

The governor mechanism of the engine E is provided with a throttle position sensor 39, the output shaft 25 of the engine E is provided with an engine rotation sensor 26, and both of these sensors 39 and 26 detect an engine loading state of the vehicle.

The forward and reverse switching device 21 includes a hydraulic clutch type switching device having two clutches of a forward clutch 21F and a reverse clutch 21R, and transmits the rotation power of the engine E in a forward (forward traveling) direction or a reverse (reverse traveling) direction to the first main speed-changing device 1a by engaging either one of the clutches according to the operation position of the forward and reverse switch lever 16.

The clutches 21F and 21R of the forward and reverse switching device 21 commonly serve as booster clutches when switching the shift position of the main speed-changing device 1 on the transmission downstream side. Namely, when switching the main speed-changing device 1, prior to this switching operation, the clutches 21F and 21R of the forward and reverse switching device 21 are turned off, and after the main speed-changing device 1 is switched, the forward clutch 21F or the reverse clutch 21R is turned on.

The first main speed-changing device 1a is a synchro mesh gear speed changing device having a "third-fourth" speed changing hydraulic cylinder 4a and a "first-second" speed changing hydraulic cylinder 4b that serve as piston type speed changing actuators, and by extending or contracting the piston of one cylinder 4a (or 4b) of the hydraulic cylinders 4a and 4b and moving a shifter engaged with the front end of the piston forward or rearward, the rotation power is transmitted to the second main speed-changing device 1b through one of four gears.

In detail, the speed is changed to the "fourth" speed by extending the piston of the "third-fourth" speed changing hydraulic cylinder 4a to the left side of the drawing, the speed is changed to the "third" speed by contracting the same piston to the right side of the drawing, the speed is changed to the "second" speed by extending the piston of the "first-second" speed changing hydraulic cylinder 4b to the left side of the drawing, and the speed by changed to the "first" speed by contracting the same piston to the right side of the drawing.

Figure 2:
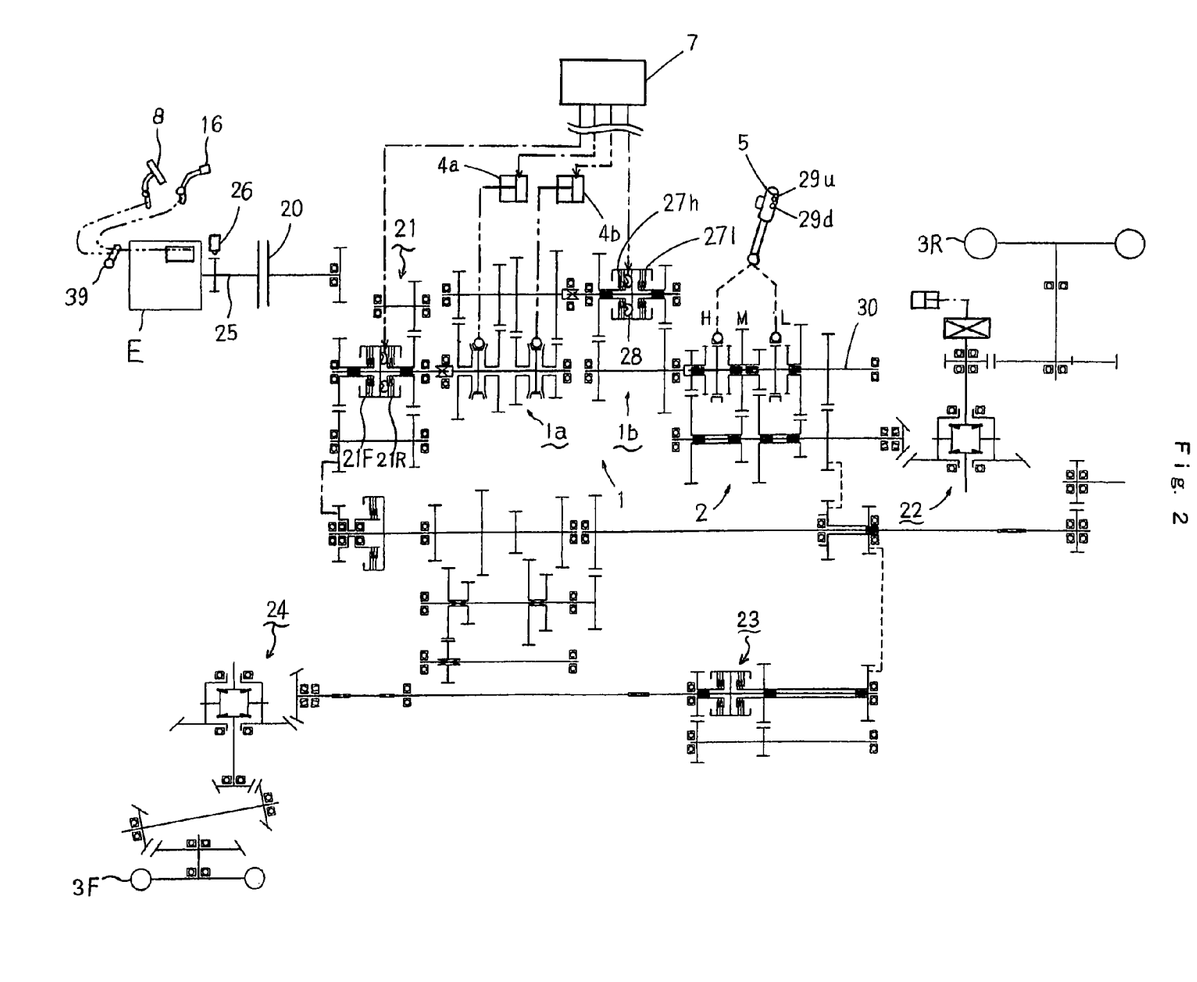
FIG. 2 is a transmission mechanical diagram of the tractor of the embodiment of the invention.

As shown in FIG. 2, the second main speed-changing device 1b is a hydraulic clutch type speed changing device of two high and low speed shift stages including a high-speed clutch 27h and a low-speed clutch 27l, and a clutch plate of either the high or low clutch is pressure-contacted by a piston inside the clutch. Thereby, the number of rotations is switched between two high and low speed shift stages, and the power is transmitted to the auxiliary speed-changing device 2.

Figure 4:
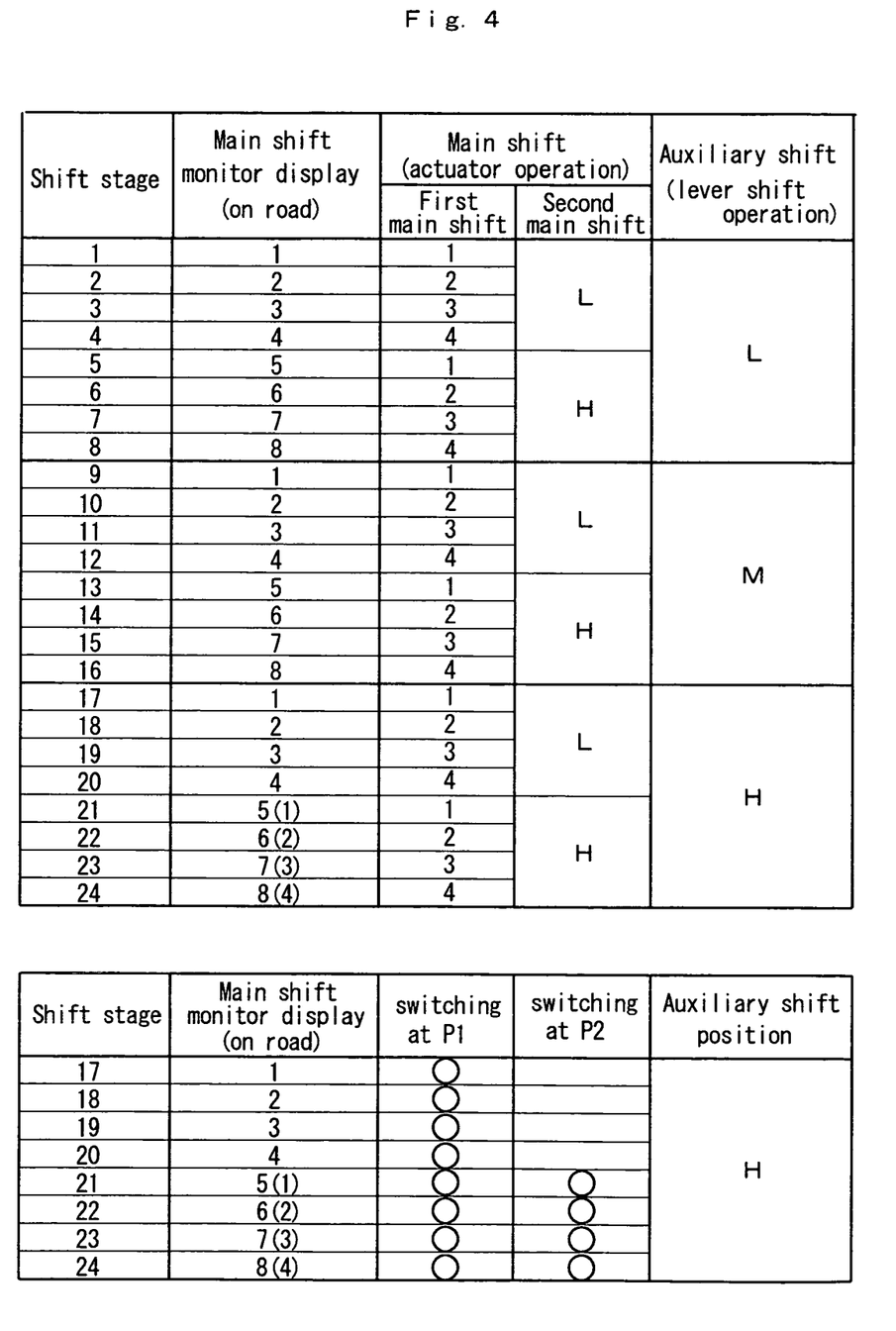
FIG. 4 is a diagram showing combinations of a main speed-changing device and an auxiliary speed-changing device, and indication on a monitor display of the tractor of the embodiment of the invention.

As described above, the main speed-changing device 1 has, as shown in FIG. 4, 4×2=8 shift stages in total that combined the shift positions of the first main speed-changing device 1a and the second main speed-changing device 1b. The main speed-changing device 1 outputs an energization instruction to solenoids 40a through 40d, 41, and 42 of directional control valves described later from a controller 7 which is a control unit in response to a depression operation on the shift up switch 29u and a shift down switch 29d provided on the grip of the shift lever 5 (see the block diagram of the control mechanism of FIG. 1), and shifts up or down the shift position of the main speed-changing device 1 one by one.

As shown in FIG. 2, the auxiliary speed-changing device 2 is a constant mesh gear type speed changing device that performs switching via a mechanical interlocking mechanism such as a rod or a link mechanism in response to a manual operation on the shift lever 5, and transmits the rotation power from the second main speed-changing device 1b via one of the three "high speed," "medium speed," and "low speed" gears, and outputs it from an auxiliary speed changing output shaft 30.

The main speed-changing device 1 and the auxiliary speed-changing device 2 of the tractor 10 constructed as described above are constructed so as to perform speed changing in 24 shift stages in total according to a combination of the eight shift stages of the main speed changing and the three shift stages of the auxiliary speed changing, as shown in the shift stage table of FIG. 4.

Figure 3:
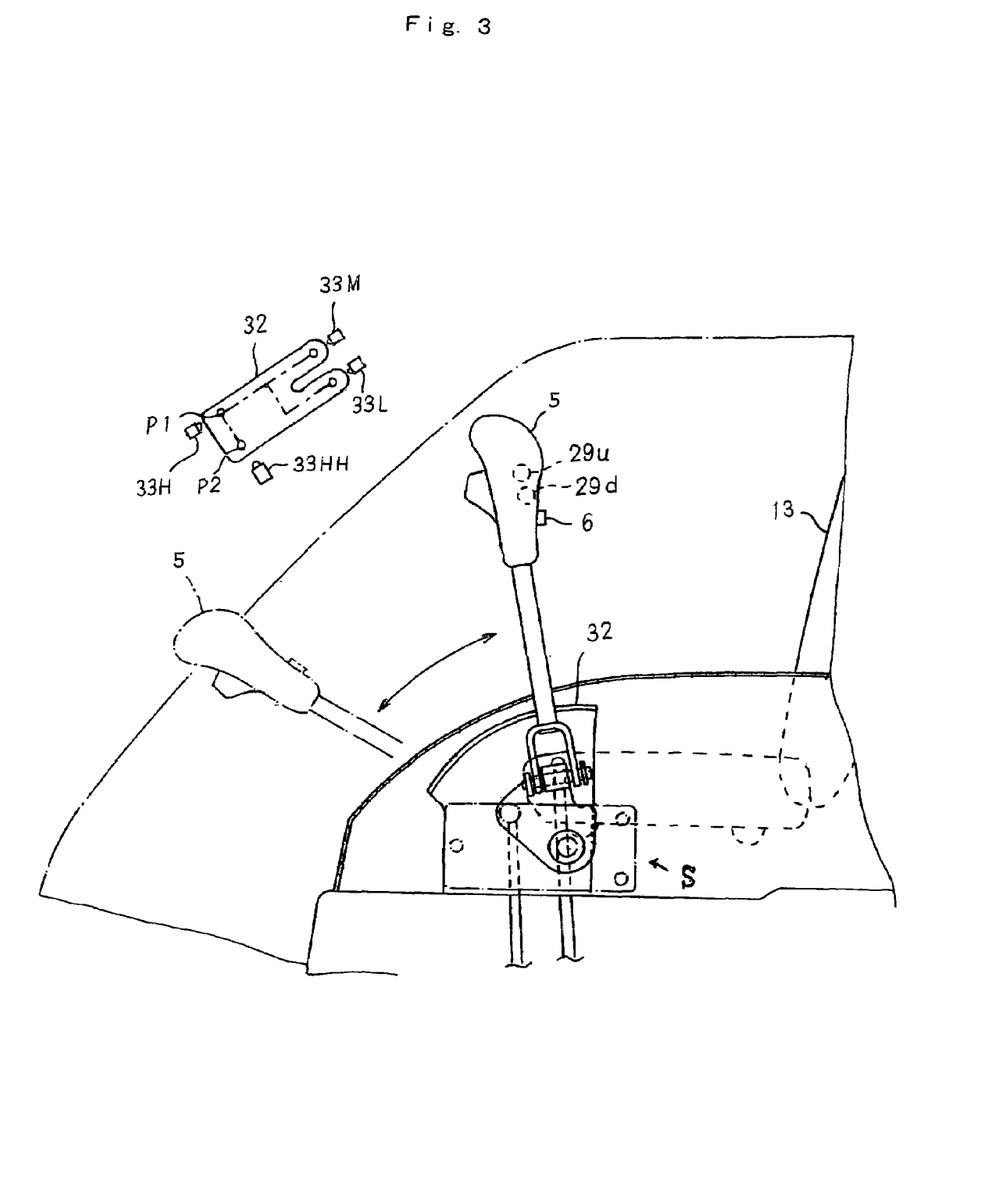
FIG. 3 is a side view of a shift lever portion and a plan view of a lever guide of the embodiment of the invention.

Next, a construction of a speed changing operation part will be explained based on FIG. 3.

The shift lever 5 is provided so as to project from a lever guide 32 opened on the left side of the driver's seat 13, and by shifting this shift lever 5, the shift position of the auxiliary speed-changing device 2 is switched by shift means S. In this case, by operating the shift lever 5 to the rearward inner side, the "M" speed of the auxiliary shift position is set, and by operating the lever to the rearward outer side, the "L" speed is set, and by operating the lever to the forward inner side, that is, the operation position P1 for working of this invention, the "H" speed as the high speed position is set. Furthermore, on the outer side in the right and left direction of the operation position P1 for working, the operation position P2 for road traveling is arranged, and by moving the shift lever 5 down to the outer side in the right and left direction while holding the lever 5 at the "H" speed of the auxiliary shift position, the operation position P2 for road traveling is set.

On the base portion of the shift lever 5, auxiliary shift position sensors 33L, 33M, 33H (operation position for working), and 33HH (operation position for road traveling) that detect the operation positions of the lever are provided, and on the grip of the lever 5, the shift up switch 29u and the shift down switch 29d, described above, are provided, and the shift position of the main speed-changing device 1 is switched one by one upon an energization instruction from the controller 7 in response to a manual operation performed by an operator. The shift lever 5 is provided with a shift control on-off switch 6 close to the shift up switch 29u and the shift down switch 29d, and by a turning on-off operation on the switch 6, various shift control modes described later are switched.

Figure 1:
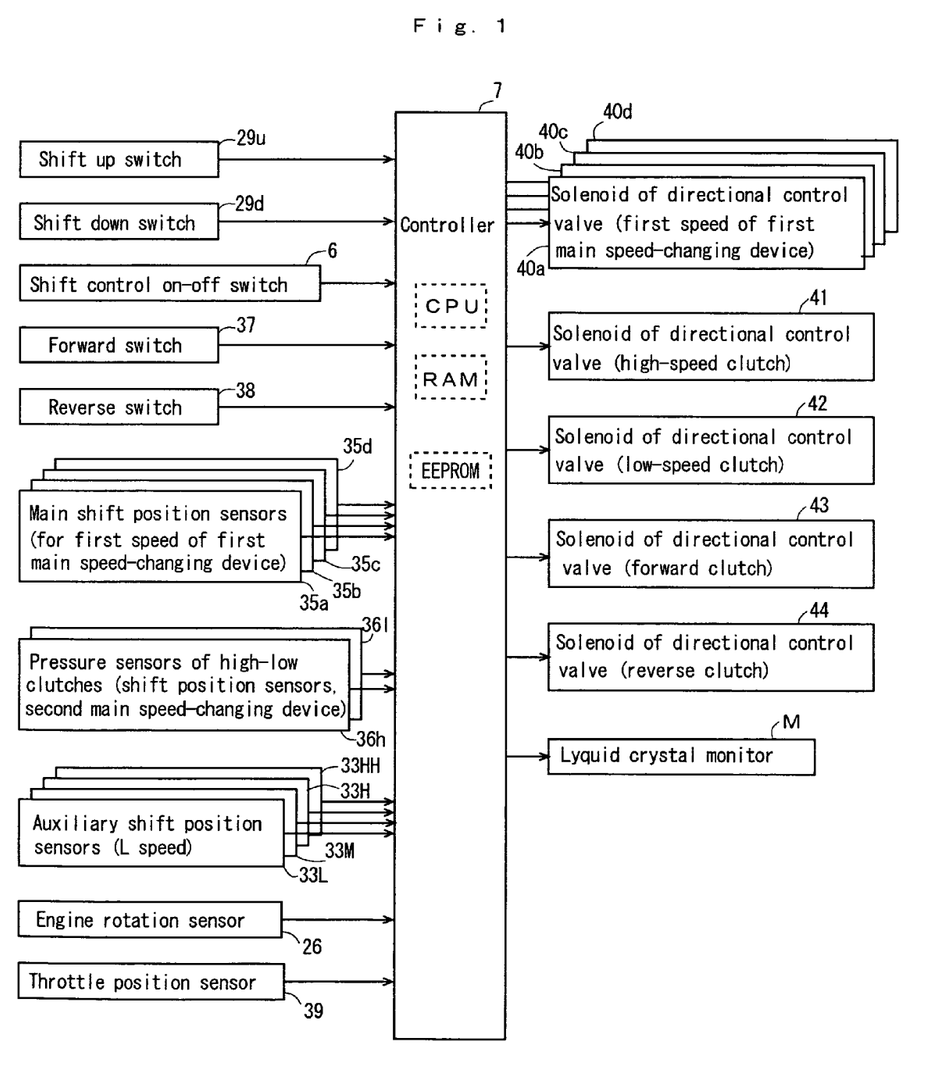
FIG. 1 is a block diagram of a control mechanism of a tractor as a traveling vehicle according of an embodiment of the invention.

Next, the controller 7 will be explained with reference to FIG. 1.

Inside the controller 7, a CPU that processes various signals, a RAM that temporarily stores various information, and an EEPROM that stores various control programs relating to shift controls, are provided, and to the input side, the shift up switch 29u and the shift down switch 29d, the shift control switch 6, the forward switch 37, the reverse switch 38, and in addition, four sensors 35a, 35b, 35c, and 35d that detect shift positions of the first main speed-changing device 1a, pressure sensors 36h and 36l that detect actuation of the second main speed-changing device 1b, auxiliary shift position sensors 33L, 33M, 33H, and 33HH that detect the shift position of the shift lever 5, an engine rotation sensor 26, and a throttle position sensor 39, etc., are provided and connected so that signals according to artificial operations and detection information when changing the speed are inputted in the controller 7.

To the output side of the controller 7, solenoids 40a, 40b, and so on of directional control valves that drive the speed-changing hydraulic cylinders 4a and 4b of the first main speed-changing device 1a, solenoids 41 and 42 of directional control valves to engage the high- and low-speed clutches of the second main speed-changing device 1b, a solenoid 43 of a directional control valve to engage the forward clutch 21F, and a solenoid 44 of a directional control valve to pressure-contact the reverse clutch 21R are provided and connected, and furthermore, a liquid crystal monitor M set on an instrument panel above the handle post is connected.

In the tractor 10 constructed as described above, various shift controls are performed according to the flowcharts of the control program shown in FIG. 7 through FIG. 10.

Various speed changes according to the control program shown in FIG. 7 through FIG. 10 are characterized in that the first shift control means and the second shift control means can be selected. Therefore, the first shift control means and the second shift control means will be explained.

First, when the shift on-off switch 6 is off, the first shift control means, explained next, works.

Generally, when the vehicle speed is changed by the auxiliary speed-changing device 2 whose change gear ratio is greater than that of the main speed-changing device 1, the vehicle speed fluctuation is great. For example, during traveling at the "H" speed of the auxiliary speed-changing device 2 and the first speed of the main speed-changing device 1, when an operator feels that the speed is excessively high, he/she changes the auxiliary speed-changing device 2 to one lower speed "M" however, the main speed-changing device 1 is left at the first speed, so that the vehicle speed sometimes may become extremely low.

To prevent such a failure, in the embodiment, the first shift control means is provided, and when the operation position of the shift lever 5 is changed and the shift lever 5 is shifted to a higher speed side, the shift position of the main speed-changing device 1 is switched to the lowest speed position, that is, the first speed, and when the shift lever 5 is shifted to the lower speed side and the shift position of the main speed-changing device 1 is switched to the highest speed position, that is, the eighth speed, whereby the vehicle speed fluctuation before and after the switching operation of the shift position of the auxiliary speed-changing device 2 by the shift lever 5 is reduced. This is the first shift control function.

Next, the function of the second shift control means will be explained.

Generally, in the case of working in one agricultural field, the vehicle speed (shift position) to be selected by each operator is almost constant. This is because the main shift position and the auxiliary shift position to be selected by each operator are determined depending on the level of skill of the operator and the details of the working.

However, it always happens that the operator interrupts the working and moves at a high speed within the field, and returns to the original place and continues the working. During moving at a high speed within the field, to greatly change the vehicle speed, the shift position of the auxiliary speed-changing device 2 whose change gear ratio is comparatively great is switched by the shift lever 5 and the shift means S and traveling is performed. For example, the vehicle is moved at a high speed within the field upon changing the speed from the medium speed M to the high speed H. If the vehicle speed is still insufficient, the shift position of the main speed-changing device 1 is also switched for traveling.

When the same kind of working is performed by returning to the original place, only by returning the shift lever 5 to the original position (for example, from the high speed H to the medium speed M), the main speed-changing device 1 is automatically switched to the shift position that has been used for a longest time.

This is the second shift control function, and this reduces the burden on the operator because the operator does not have to remember the shift position of the main speed-changing device 1 that the operator used for the previous working. When the second shift control works, even if the vehicle speed is changed in the middle, at the time of working, an optimum vehicle speed that the operator had used before the change is set for working.

The occasion in that such second shift control is necessary is limited to the time when the shift lever 5 is at the operation position P1 for working (in this embodiment, the H speed, the M speed, and the L speed except for the position for road traveling), and the second shift control is not necessary when the lever is at the position P2 for road traveling (in this embodiment, the HH speed). Therefore, in this embodiment, the second shift control works when the shift on-off switch 6 is on and the shift position is at a position other than the position P2 for road traveling (in this embodiment, the HH speed).

The reason for working the first shift control means when the shift on-off switch 6 is off is for prioritizing shift control by the accelerator pedal 8 or the throttle lever 17 that functions when the shift on-off switch 6 is on and the function of the second shift control means.

Based on the premises described above, the flowchart of FIG. 7 will be explained first.

Figure 7:
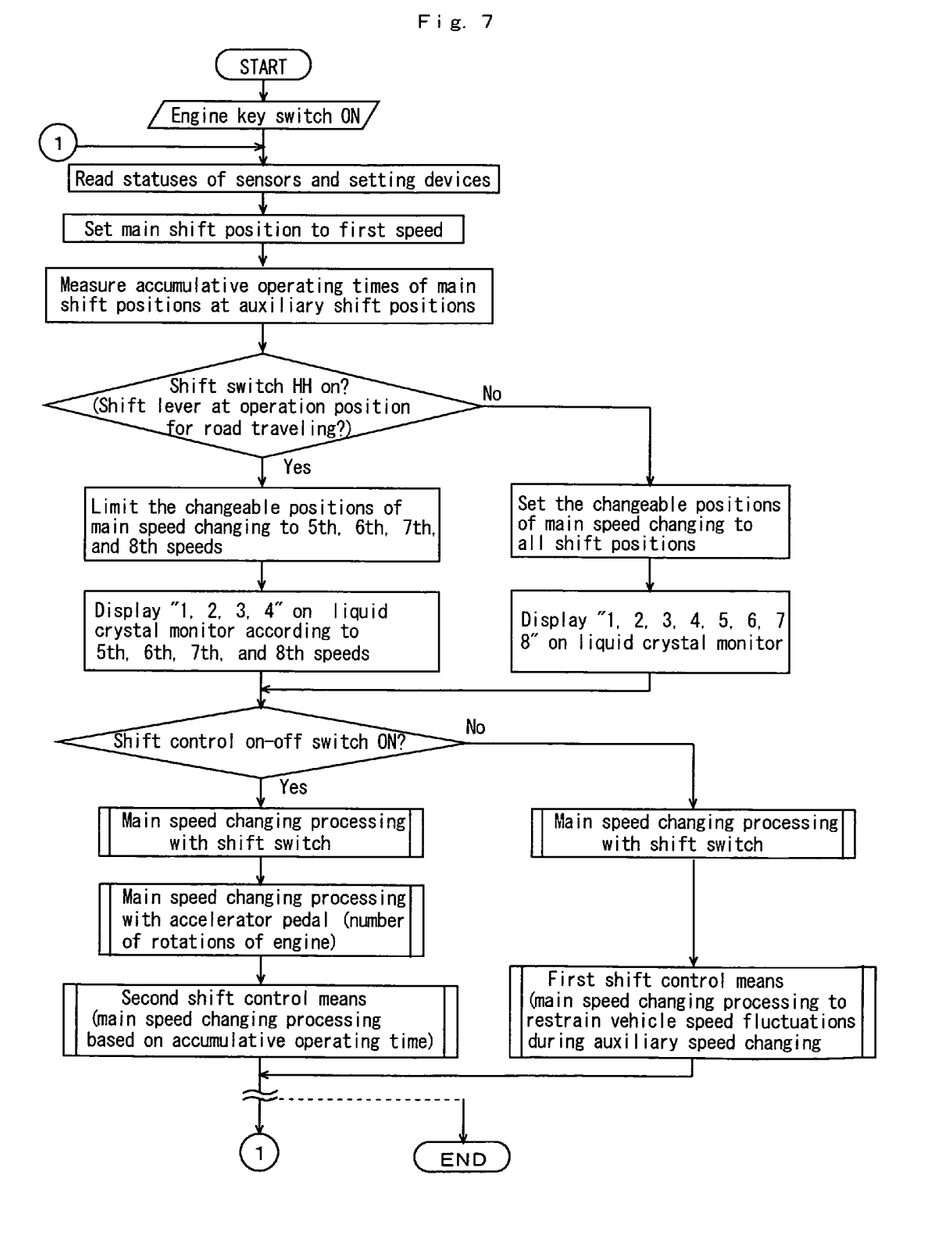
FIG. 7 is a flowchart of shift control of the tractor of the embodiment of the invention.

When the engine key switch of the tractor 10 is turned on to turn the electric components on, the controller 7 reads the statuses of the sensors and setting devices, and subsequently, sets the main shift position to a predetermined position.

Next, it is judged from the detection values of the auxiliary shift position sensors 33L, 33M, and 33HH whether the shift lever 5 is at the operation position P2 for road traveling or at a shift position intended for working, and when the shift lever is at the operation position P2 for road traveling (the detection position of the sensor 33HH in this embodiment), the speed changeable positions of the main speed-changing device 1 are limited to the positions of the fifth speed, the sixth speed, the seventh speed, and the eighth speed, and when the shift lever is at a position other than the operation position P2 for road traveling, the speed changeable positions of the main speed-changing device 1 are set to all of the first through eighth speed positions. Namely, when the shift lever 5 is set to the operation position P2 for road traveling, among the eight speed shift stages that can be selected by the main speed-changing device 1, the speed becomes changeable only among the four stages (in detail, the fifth speed, the sixth speed, the seventh speed, and the eighth speed) in the high-speed range, and the low-speed range (the first speed, the second speed, the third speed, and the fourth speed) cannot be selected (see the circles in the lower table of FIG. 4).

The speed changeable positions are displayed on the liquid crystal monitor M. On the monitor display, when the shift lever 5 is operated to the operation position P2 for road traveling, the fifth speed, the sixth speed, the seventh speed, and the eighth speed are displayed corresponding to the first speed, the second speed, the third speed, and the fourth speed of road traveling.

Next, the setting state of the shift control on-off switch 6 provided on the shift lever 5 is judged, and when the shift control on-off switch 6 is off, the main speed changing processing is executed by the shift switches 29u and 29d and the first shift control subroutine to restrain vehicle speed fluctuation before and after the auxiliary speed changing operation is executed.

On the other hand, when the shift control on-off switch 6 is on, the main speed changing processing by the shift switches 29u and 29d, the main speed changing processing for interlocking with an operation on the accelerator pedal 8, and the second shift control subroutine according to an accumulative operating time of the main speed changing, are executed. Namely, when the shift control on-off switch 6 is on, if the shift lever 5 is at the position P2 for road traveling, speed changing with the accelerator pedal 8 is possible, and when the shift lever 5 is at the operation position P1 for working intended for working and the operation position of the shift lever 5 is changed, the second shift control to switch the shift position to the main shift position whose accumulative operating time is the longest is performed.

Figure 8:
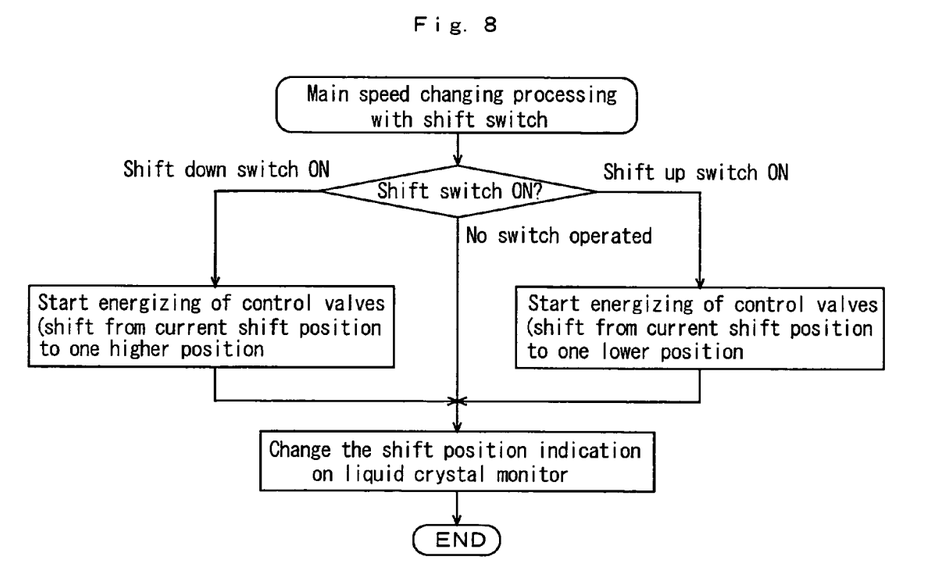
FIG. 8 is a control flowchart of main speed changing processing with a shift switch of the tractor of the embodiment of the invention.

In the main shift control with the shift switches 29u and 29d, as shown in FIG. 8, depression on the shift up switch 29u and the shift down switch 29d is judged, and according to this, the main shift position is shifted up or down one by one from a current position in the range from the first speed to the eighth speed by energizing the solenoids 40a through 40d, 41, and 42 of the control valves.

Figure 9:
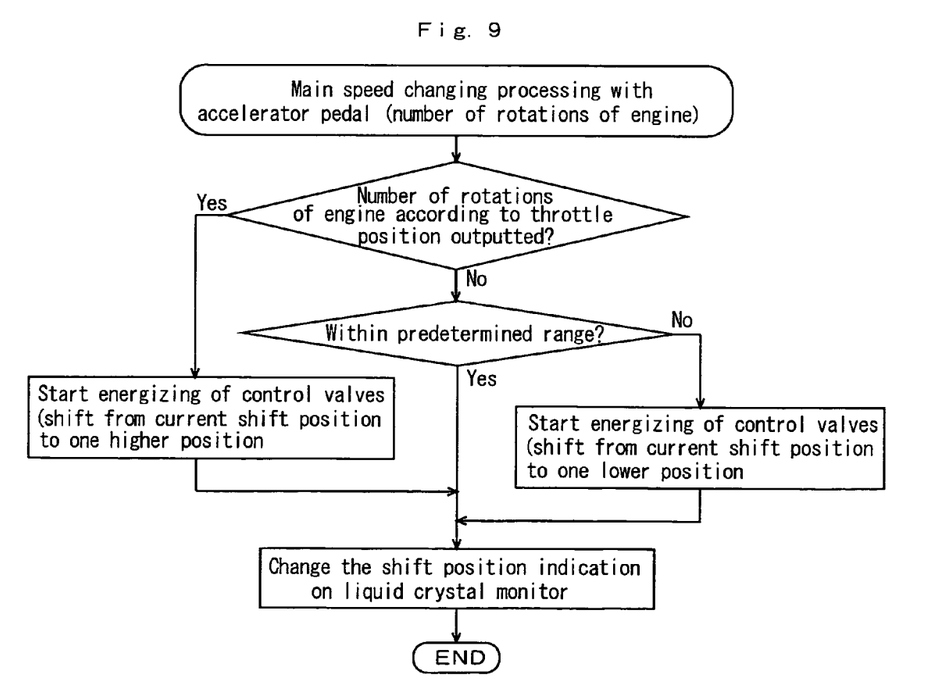
FIG. 9 is a control flowchart of main speed changing processing with an accelerator pedal of the tractor of the embodiment of the invention.

In the main speed changing processing with the accelerator pedal 8, as shown in FIG. 9, it is judged whether the number of rotations of the engine according to the throttle position is outputted from the throttle position sensor 39 and the engine rotation sensor 26, and when "YES" is judged, the main shift position is shifted to one higher stage from the current position according to stepping on the accelerator pedal 8. On the other hand, when "NO" is judged, it is judged whether this number of rotations is within the predetermined range, and when the number of rotations of the engine is within a predetermined range, the current main shift position is kept, and when the number of rotations of the engine is lower than a predetermined number, a high loading state is judged and the main shift position is shifted to one lower stage from the current position.

Figure 10:
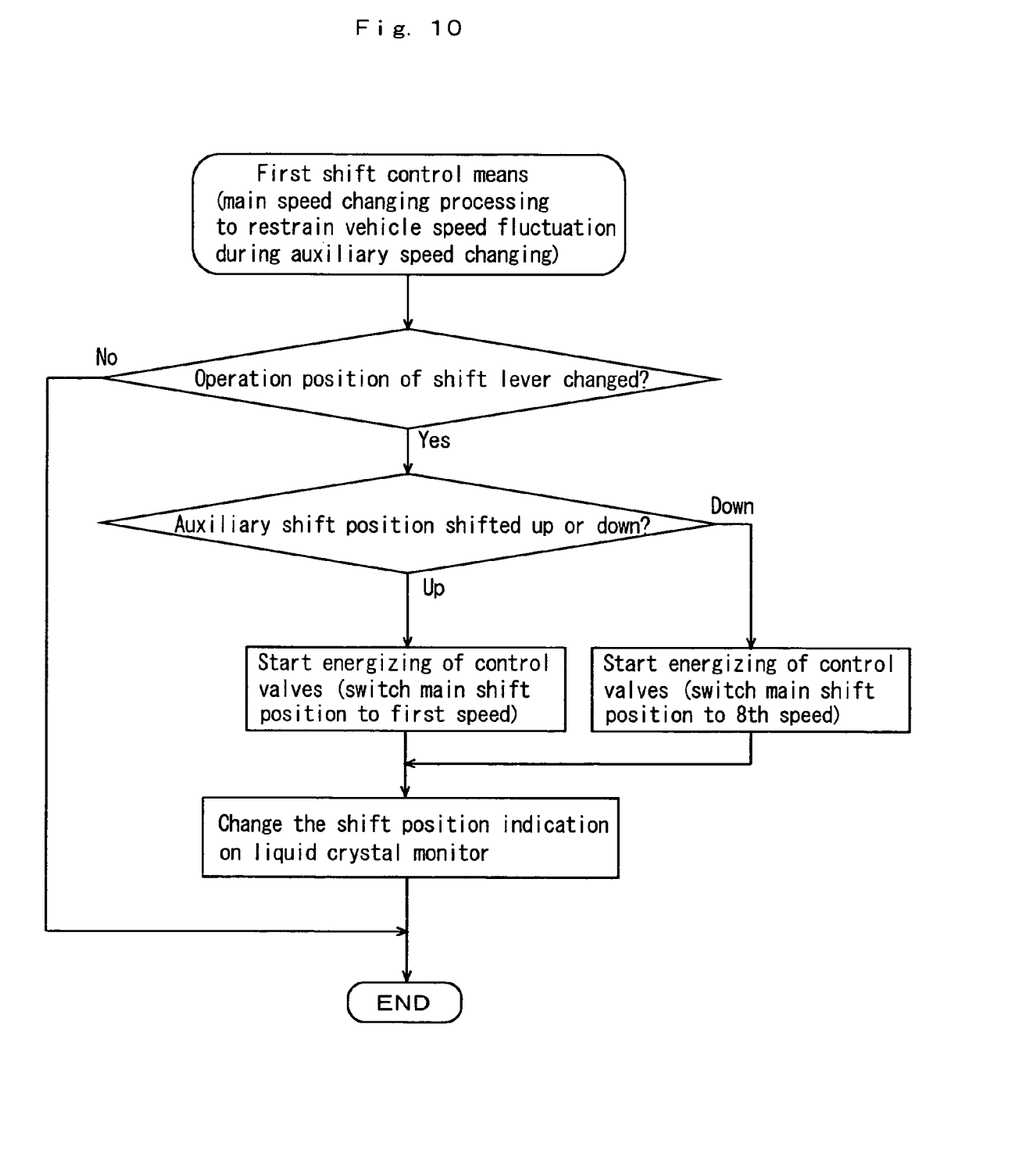
FIG. 10 is a control flowchart of first shift control means of the tractor of the embodiment of the invention.

In the first shift control processing, as shown in FIG. 10, it is judged whether the operation position of the shift lever 5 has been changed, and when "YES" is judged, it is further judged whether the shift lever 5 has been operated to the higher speed side or the lower speed side. When it is judged that the shift lever 5 has been shifted to the higher speed side, a switching instruction is outputted to the solenoids 40, 43, and 44 of the control valves to switch the shift position of the main speed-changing device 1 to the lowest shift position, that is, the first speed. On the other hand, when it is judged that the shift lever 5 has been shifted to the lower speed side, a switching instruction is outputted to the solenoids 40, 43, and 44 of the control valves to switch the shift position of the main speed-changing device 1 to the highest speed position, that is, the eighth speed.

Thereby, when the shift position of the auxiliary speed-changing device 2 is switched with the shift lever 5, the vehicle speed fluctuation before and after the switching operation is reduced.

Figure 11:
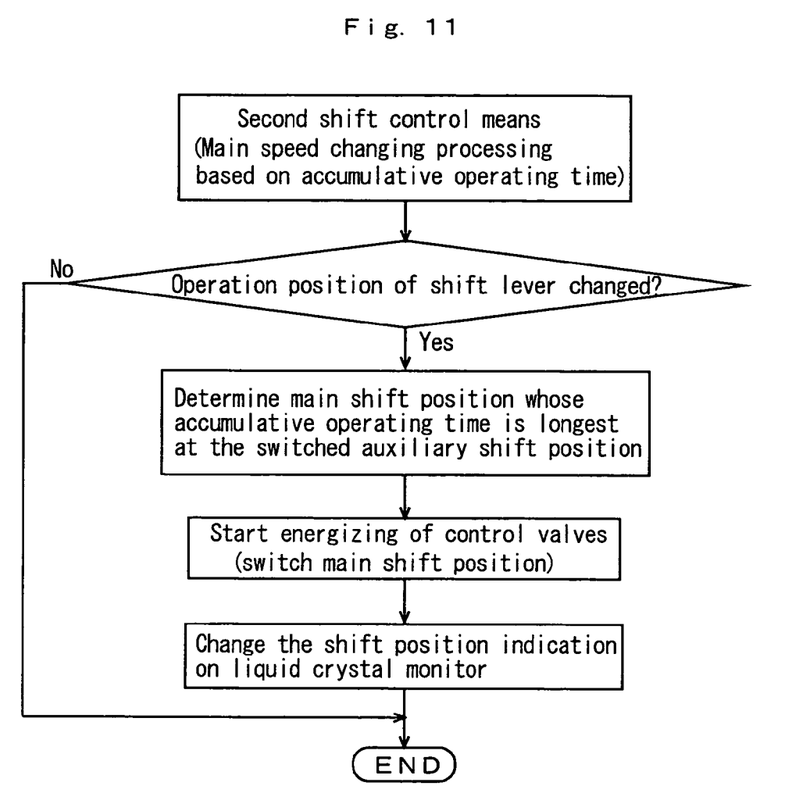
FIG. 11 is a control flowchart of second shift control means of the tractor of the embodiment of the invention.

In the second shift control processing, as shown in FIG. 11, it is judged whether the operation position of the shift lever 5 has been changed, and when "YES" is judged, the main shift position whose accumulative operating time is longest at the switched auxiliary shift position is selected, and the main shift position is switched to this position by energizing the solenoids 40a through 40d, 41, and 42 of the control valves. Therefore, when the first shift control works, the main speed-changing device is automatically switched to the main shift position that has been used for a longest time.

Then, when the main shift position is changed, the shift position indication on the liquid crystal monitor M is changed.

As described above, in the tractor 10, eight stages in total of the main speed changing can be selected during working, and on the other hand, during road traveling, the speed can be changed only in the four stages of the high speed side, so that the vehicle speed can be more easily and quickly increased when traveling on a road in comparison with shifting up/down of the main speed-changing device 1a one by one in eight stages in total.

Particularly, at the operation position P2 for road traveling, by interlocking with the number of rotations of the engine according to stepping on the accelerator pedal 8, the main shift position is also shifted up and down, so that in comparison with the construction in which the main shift position is kept constant during traveling, the fuel cost can be reduced, and the vehicle can be smoothly started and subsequently changed in speed.

Figure 12:
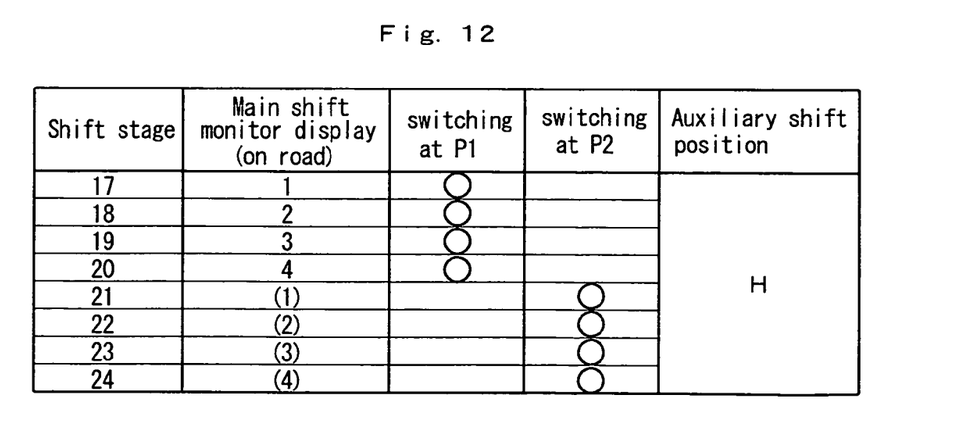
FIG. 12 is a diagram showing another form of main shift positions changeable at an operation position for road traveling of the tractor of the embodiment of the invention.
Figure 13:
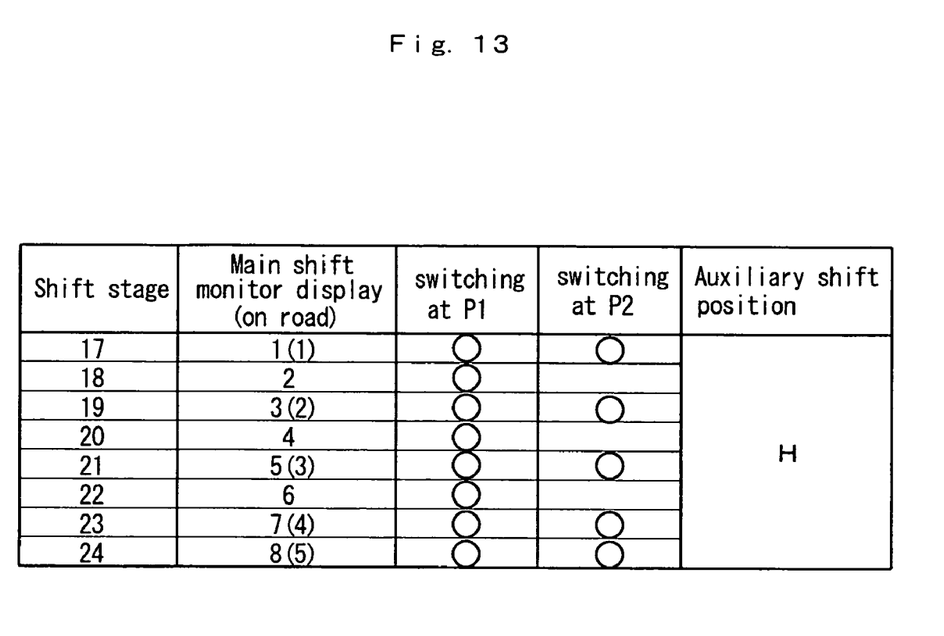
FIG. 13 is a diagram showing another form of main shift positions changeable at an operation position for road traveling of the tractor of the embodiment of the invention.

As another embodiment of the changeable positions at the operation position P1 for working and the operation position P2 for road traveling, as shown in FIG. 12, it is also possible that the low-speed range from the speed shift seventeenth stage to the twentieth stage is set as the operation position P1 for working, and the high-speed range from the twenty-first stage to the twenty-fourth stage is set as the operation position P2 for road traveling, or as shown in FIG. 13, the entire range from the seventeenth stage to the twenty-fourth stage is set as the operation position P1 for working, and for the operation position P2 for road traveling, the main speed shift stage is set to every other stage, that is, the seventeenth stage, the nineteenth stage, the twenty-first stage, the twenty-third stage, and the twenty-fourth stage.

In the tractor 10 explained in this embodiment, the throttle position and the number of rotations of the engine can also be adjusted and kept by an operation on the throttle lever 17. Therefore, for example, during road traveling, upon setting the shift lever 5 to the operation position P2 for road traveling, the throttle lever 17 can be kept at an arbitrary position regardless of the accelerator pedal 8.

In this invention, the shift control on-off switch 6 is provided on the grip of the shift lever, however, the shift control on-off switch is allowed to be provided on a lever guide 32 portion near the lever or on the fender portion.

In addition, it is also allowed that the main speed changing processing according to the accelerator pedal 8 restrains its actuation according to detection by the reverse switch 38, that is, when the vehicle travels in reverse. Thereby, when traveling in reverse, the vehicle speed is not increased, and if necessary, the vehicle speed can be adjusted by an operation on the switch, so that the safety of the vehicle is improved and the operability is not lost.

INDUSTRIAL APPLICABILITY

The invention provides a working vehicle having a shift control device that can reduce shift operations according to the state of use or the purpose of use of the vehicle or make vehicle traveling smooth during various agricultural works and during road traveling even when the working vehicle has a speed changing device having a large number of shift positions finely set for various works.

What is claimed is:

1. A working vehicle comprising:
   an engine;
   a main speed-changing device that changes the rotation power of the engine to any of a plurality of shift positions;
   an auxiliary speed-changing device that further shifts the shift position selected by the main speed-changing device to any of the plurality of shift positions;
   wheels that are transmitted the rotation power of the engine through the main and auxiliary speed-changing devices;
   a shift lever that switches the shift position of the auxiliary speed-changing device by manual operation;
   an accelerator pedal and/or a throttle lever for adjusting the rotation speed of the engine by manual operations;
   shift means that makes the shift lever switchable between an operation position P1 for working, intended for working other than road traveling, and an operation position P2 for road traveling, intended for road traveling; and
   a shift control device that switches the shift position of the main speed-changing device by interlocking with a manual operation on the accelerator pedal and/or the throttle lever, disables shifting of the main speed-changing device to the shift range of the low speed side, and enables shifting to the shift range of the high speed side when the shift lever is switched to the operation position P2 for road traveling.

2. The working vehicle according to claim 1, wherein shift switches that shift up and down the shift position of the main speed-changing device one by one are provided on the shift lever, and an operation switch that enables switching of the main speed-changing device by interlocking it with an operation on the accelerator pedal and/or the throttle lever when the shift lever is switched to the operation position P2 for road traveling are provided on or near the shift lever.

3. The working vehicle according to claim 2, wherein the shift control device comprises:
first shift control means constructed so that, when it switches the shift lever to the low speed side while the operation switch is not actuated, the main speed-changing device is responsively switched to the high speed side, and when it switches the shift lever to the high speed side, the main speed-changing device is responsively switched to the low speed side, and second shift control means for switching the main speed-changing device to a main shift position whose past accumulative operating time in the past is longest when the shift lever at the operation position P1 for working is operated during actuation of the operation switch.

4. The working vehicle according to claim 1, wherein a reverse switch that enables the working vehicle to travel in reverse is provided, and the shift control device restrains speed control of the accelerator pedal and/or the throttle lever during actuation of the reverse switch.

5. The working vehicle according to claim 2, wherein a reverse switch that enables the working vehicle to travel in reverse is provided, and the shift control device restrains speed control of the accelerator pedal and/or the throttle lever during actuation of the reverse switch.

6. The working vehicle according to claim 3, wherein a reverse switch that enables the working vehicle to travel in reverse is provided, and the shift control device restrains speed control of the accelerator pedal and/or the throttle lever during actuation of the reverse switch.

* * * * *